United States Patent Office 3,318,876
Patented May 9, 1967

3,318,876
SUBSTITUTED PIPERAZINES AND PROCESS FOR PREPARING SAME
Giorgio Cignarella, Milan, Italy, and Emilio Testa, Tessin, Switzerland, assignors to Lepetit S.p.A., Milan, Italy
No Drawing. Filed Nov. 26, 1963, Ser. No. 326,214
Claims priority, application Great Britain, Dec. 11, 1962, 46,744/62; June 17, 1963, 24,045/63
8 Claims. (Cl. 260—240)

This invention relates to new pharmacologically active compounds. More particularly this invention is concerned with a compound of the following general formula:

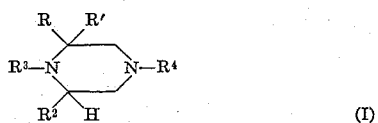

wherein R and $R^2$ are lower alkyl, $R'$ represents hydrogen or lower alkyl, and $R^3$ and $R^4$ represent H, alkyl, aralkyl, aralkenyl, alkanoyl, aralkanoyl, aralkenoyl and its non-toxic pharmaceutically acceptable addition salts.

To prepare the substituted piperazine of the invention a process is employed, which involves two independent series of steps.

In the first series of steps an α-substituted α-bromo-acetic acid benzylamide is reacted with an α-substituted glycine ethyl ester in the presence of a proton acceptor to yield the correspondingly substituted iminodiacetic ester benzylamide, which is treated to give the corresponding 2,6-substituted-4-benzyl-3,5-diketopiperazine, which by reduction with LiAlH$_4$ in an inert organic solvent leads to 2,6-substituted-4-benzylpiperazine in accordance with the following equation:

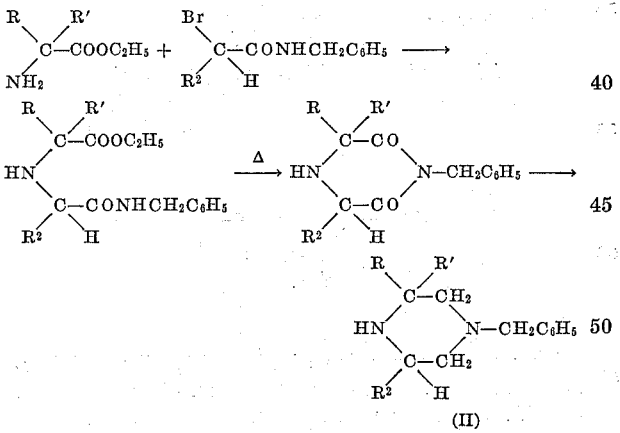

wherein R, $R'$ and $R^2$ have the above significance.

In the second series of steps the process comprises the introduction by conventional methods of substituents on the N-atoms of the piperazine nucleous.

Thus 4-benzyl-2,6-substituted piperazine (II), by reacting with a halocompound gives 1,2,6-substituted-4-benzylpiperazine, which by removal of the benzyl group by the usual methods, used for the purpose, gives the coresponding 1,2,6-substituted piperazine; while, by reacting with a functional derivative of an acid in the presence of a proton acceptor, compound II gives the corresponding 1-acyl-2,6-substituted-4-benzylpiperazine, which by removal of the benzyl group gives 1-acyl-2,6-substituted piperazine.

1,2,6-substituted piperazine and 1-acyl-2,6-substituted piperazine by reacting with a functional derivative of an acid, as with a halocompound, lead respectively to 1,2,6-substituted-4-acylpiperazine and 1-acyl-2,4,6-substituted piperazine. By reacting 4-benzyl-2,4,-substituted piperazine (II) with benzoyl chloride in the presence of a proton acceptor, 1-benzoyl-4-benzyl-2,6-substituted piperazine is obtained, which by removal of the benzyl group and subsequent reduction gives 1-benzyl-2,6-substituted piperazine. This compound, according to the procedure described above for the analogous 4-benzyl-2,6-substituted piperazine gives: 2,4,6-substituted piperazine, 4-acyl-2,6-substituted piperazine, 2,4,6-substituted 1-acyl-piperazine and 1,2,6-substituted-4-acyl-piperazine. Through the nuclear magnetic resonance spectrum it was possible to establish the cis-configuration of both alkyl groups at position 2 and 6 in the 2,6-dialkyl derivatives.

The compounds of the invention show analgetic properties. Thus 2,6-dimethyl-1-propionyl-4-cinnamylpiperazine, when administered to rats at the doses of 2 mg./kg. and 3 mg./kg. by intraperitoneal route causes a percentage increase of the pain threshold of the inflamed foot of 131 and 378 respectively, when tested according to the method of L. O. Randall and J. J. Selitto. (Arch. Intern. Pharmacol. 111, 409, 1957). They are moreover active as coronary dilators. For instance, 1-propionyl-2,4,6-trimethyl-piperazine causes at the dose of 20 γ/ml. on the isolated guinea pig heart a percentage increase of the coronary blood flow of 80 leaving the cardiac contractivity substantially unchanged in amplitude and frequency.

The following examples illustrate the invention without limiting it.

EXAMPLE 1

Preparation N-(α-carbethoxyethyl)-alanine benzylamide

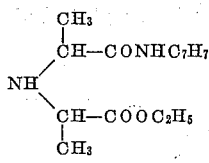

A mixture of 105 g. (0.435 mol) of α-bromopropionic acid benzylamide, 43.5 g. of triethylamine (0.435 mol), 51 g. of α-alanine ethyl ester (0.435 mol), and 500 ml. of toluene is refluxed for 15 hours, cooled and filtered. The filtrate is concentrated in vacuo, the oily residue taken up with 300 ml. of 10% HCl and extracted with ethyl ether.

The mother liquor is made alkaline with a sodium carbonate solution and the separated oil is thoroughly extracted with ethyl ether. The ether extract is dried over Na$_2$SO$_4$, the solvent is distilled off and the residue distilled in a Claisen flask. Yield 99 g. (82%), B.P. 165–70° C./1 mm. Hg.

Preparation of 2,6-dimethyl-4-benzyl-3,5-diketopiperazine

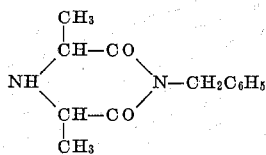

90 g. of N-(α-carbethoxyethyl)-alanine benzylamide are heated at 200–220° C. for 3 hours under slight vacuum in order to facilitate removal of ethyl alcohol. The product is then distilled and 82 g. of crude 2,6-dimethyl-4-benzyl-3,5-diketopiperazine, B.P. 150–60° C./0.5 mm. Hg, are collected. The distillate is purified by dissolving it in 200 ml. absolute alcohol, and precipitating the hydrochloride by the addition of 100 ml. of HCl-saturated ether. After ice-cooling the hydrochloride is collected, suspended in water and the suspension is made alkaline with a saturated solution of $Na_2CO_3$. The separated oil is extracted with ethyl ether, the solvent is removed and the residue is distilled, giving 60.5 g. (80.6%), B.P. 148–50° C./0.5 mm. Hg; M.P. 62–63° C. (petroleum ether). The hydrochloride was M.P. 212–14° C.

Preparation of 2,6-dimethylpiperazine

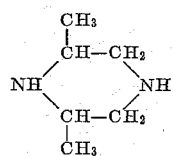

To a cooled suspension (—5° C.) of 60 g. $LiAlH_4$ in 1500 ml. anhydrous ethyl ether, 60 g. of 2,6-dimethyl-4-benzyl-3,5-diketopiperazine in 1500 ml. anhydrous ether are added in one hour. The mixture is refluxed for 6 hours, cooled to —5° C. and cautiously decomposed with 150 ml. $H_2O$. Stirring is continued 30 minutes at room temperature, the inorganic salts are filtered off and thoroughly washed with ethyl ether. The ether extracts are collected and added to the ether filtrate, the mixture, made anhydrous over $Na_2SO_4$, the solvent is evaporated and the residue distilled, giving 51.2 g. of 2,6-dimethyl-4-benzyl-piperazine (97%), B.P. 85° C./0.6 mm. Hg; $n_D^{20}$ 1.5363. This last product is hydrogenated in an autoclave in absolute ethyl alcohol in the presence of 10% palladium on charcoal as catalyst under 20 atmospheres of pressure at 40° C. The mixture is then cooled at room temperature and filtered. The solvent is removed and the residue distilled giving 24 g. of 2,6-dimethylpiperazine, B.P. 150–60° C. M.P. 118–20° C.

EXAMPLE 2

*N-[1-(1-carbethoxyisopropyl)]-alanine benzylamide*

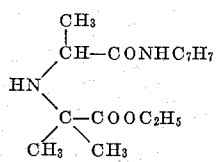

A mixture of 33.08 g. of α-bromopropionic acid benzylamide, 14 g. of triethylamine, 18 g. of ethyl-α-aminoisobutyrate and 50 ml. of anhydrous toluene is refluxed for 30 hours, cooled and filtered. The filtrate is concentrated in vacuo, the oily residue is taken up with 100 ml. HCl and extracted with diethyl ether. The mother liquor is made alkaline with a sodium carbonate solution, extracted with diethyl ether and dried over $Na_2SO_4$. The solvent is distilled off and the residue distilled in vacuo. Yield 18.4 g.; B.P. 145.60/0.8 mm. Hg.

2,2,6-trimethyl-4-benzyl-3,5-diketopiperazine

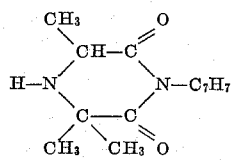

14 g. of N-[1-(1carbethoxyisopropyl)]-alanine benzylamide are heated at 200–205° C. for 3 hours under slight vacuum in order to facilitate removal of ethyl alcohol. The product is then distilled in vacuo at 160–170° C./0.8 mm. Hg. The crude product is purified by dissolving it in 25 ml. alcohol and precipitating the hydrochloride by the addition of 25 ml. of HCl-saturated ether. After cooling, the hydrochloride is collected, and dried in an oven in vacuo to give 10.5 g. of 2,2,6-trimethyl-4-benzyl-3,5-diketopiperazine, M.P. 217–20°.

The hydrochloride is suspended in alkaline solution and extracted with diethyl ether, the ether solution is dried over $Na_2SO_4$ and evaporated to dryness, and the residue is distilled in vacuo to give the corresponding free base; B.P. 160°/0.8 mm. Hg.

2,2,6-trimethyl-4-benzylpiperazine

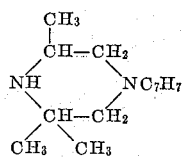

To a cooled suspension of 8.6 g. $LiAlH_4$ in 250 ml. of anhydrous diethyl ether, 8.6 g. of 2,2,6-trimethyl-4-benzyl-3,5-diketopiperazine in 250 ml. of anhydrous diethyl ether are added dropwise. The mixture is then refluxed 6 hours, cooled and decomposed with 26 ml. $H_2O$; the stirring is continued further half an hour at room temperature; the inorganic salts are filtered off and thoroughly washed with diethyl ether. The ether extracts and ether filtrate are combined and are dried over $Na_2SO_4$ and the solvent is removed. The residue distilled in vacuo gives 6.5 g. of 2,2,6-trimethyl-4-benzylpiperazine; B.P. 80–85° C./0.6 mm. Hg.

EXAMPLE 3

*1-benzoyl-4-benzyl-2,6-dimethylpiperazine*

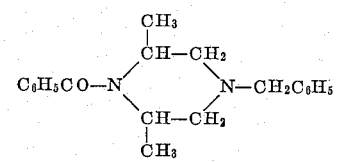

To a cooled suspension of 4-benzyl-2,6-dimethylpiperazine in 300 ml. 5% sodium hydroxide, 42, g. of benzoyl chloride was added with stirring. The reaction mixture was stirred for 2 hours at room temperature, acidified with hydrochloric acid and the unreacted benzoyl chloride was extracted with ether. The acid layer was basified with sodium carbonate and the viscous oil that separated was thoroughly extracted with ether. After drying over sodium sulfate, the solvent was evaporated and the residue distilled, collecting the fraction boiling at 190°/1 mm. Yield 80 g. (96%).

*Analysis.*—Calcd. for $C_{20}H_{24}N_2O$: C, 77.87; H, 7.84; N, 9.08. Found: C, 77.52; H, 8.02; N, 9.31.

*1-benzoyl-2,6-dimethylpiperazine*

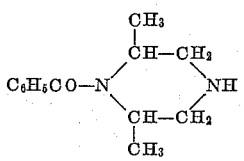

A solution of 75 g. of 1-benzoyl-4-benzyl-2,6-dimethylpiperazine in 500 ml. of absolute ethanol was hydrogenated at 60° and 50 atm. of initial pressure of hydrogen, in the presence of 10 g. 10% palladium on carbon. The catalyst was filtered off, the solvent was evaporated and the residue was distilled to yield 46.3 (87.5%) of benzoyl-2,6-dimethylpiperazine; B.P. 110–112°.

*Analysis.*—Calcd. for $C_{13}H_{18}N_2O$: C, 71.52; H, 8.30; N, 12.83. Found: C, 71.39; H, 8.42; N, 12.66.

The n.m.r. spectrum showed absorption at 1.28 (doublet, 6H, methyl hydrogens), 1.45 (singlet, 1H, hydrogen bonded to nitrogen), 2.74 (doublet, 6H, methylene hydrogens) 4.12 (multiple, 2H, hydrogens bonded to the carbon of the piperazinic ring), 7.29, (5H, aromatic hydrogens).

The d-tartrate was obtained by evaporating to dryness an ethanol solution of equimolecular amount of the base and d-tartaric acid. The solid product was purified by crystallization from ethanol. M.P. 198–200°.

*Analysis.*—Calcd. for $C_{13}H_{18}N_2O \cdot C_4H_6O_6$: C, 55.42; H, 6.57; N, 7.60. Found: C, 55.21; H, 6.67; N, 7.63.

*1-benzyl-2,6-dimethylpiperazine*

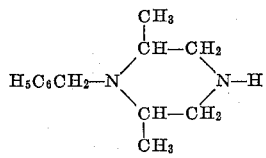

A solution of 30 g. of 1-benzoyl-2,6-dimethylpiperazine in 300 ml. of ether was added dropwise and with stirring to a cooled suspension in 300 ml. of ether of 30 g. of lithium aluminum hydride. The mixture was refluxed for 6 hours, then cooled at −5° and cautiously decomposed with 90 ml. of water. The mass was stirred for 1 hour at room temperature, the inorganic salts were filtered and washed with ether. The filtrate and washings were combined, dried over sodium sulfate, the solvent was evaporated and the residue was distilled to yield 25.8 g. (92%) of 1-benzyl-2,6-dimethylpiperazine; B.P. 97–98°/0.6 mm., $n_D^{20}$ 1.5473.

*Analysis.*—Calcd. for $C_{13}H_{20}N_2$: C, 76.42; H, 9.86; N, 13.71. Found: C, 76.40; H, 10.09; N, 13.51.

*1-benzyl-4-benzoyl-2,6-dimethylpiperazine*

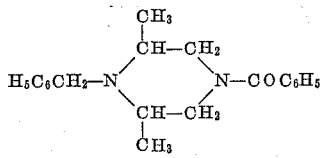

This compound was obtained in 80% yield from 1-benzyl-2,6-dimethylpiperazine following the procedure described for the isomer 1-benzoyl-4-benzyl-2,6-dimethylpiperazine. B.P. 200°/1 mm., M.P. 117–119° (ether).

*Analysis.*—Calcd. for $C_{20}H_{24}N_2O$: C, 77.87; H, 7.84; N, 9.08. Found: C, 78.11; H, 8.03; N, 8.89.

*4-benzoyl-2,6-dimethylpiperazine*

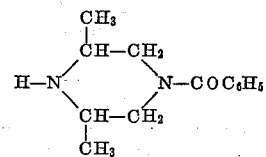

This compound was obtained by catalytic debenzylation of 1-benzyl - 4 - benzoyl-2,6-dimethylpiperazine following the procedure described for 1-benzoyl-4-benzyl-2,6-dimethylpiperazine. B.P. 160°/1 mm., M.P. 117–119° (ether).

*Analysis.*—Calcd. for $C_{13}H_{18}N_2O$: C, 71.52; H, 8.30; N, 12.83. Found: C, 71.69; H, 8.34; N, 12.73.

The infrared spectrum of 4-benzoyl-2,6-dimethylpiperazine in chloroform solution presented marked differences in the finger print in comparison with that of 1-benzoyl-2,6-dimethylpiperazine.

The n.m.r. spectrum showed absorption at 0.97 (doublet, 6H, methyl hydrogens), 1.32 (singlet, 1H, hydrogen attached to nitrogen), 2.65 (multiplet, 6H, methylene hydrogens), 4.00 (multiplet, 2H, hydrogens bonded to the carbon of the piperazinic ring), 7.31 (singlet, 5H, aromatic hydrogens).

EXAMPLE 4

*1-propionyl-2,2,6-trimethyl-4-benzylpiperazine*

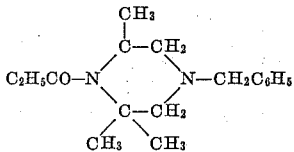

To 35 g. of 2,2,6-trimethyl-4-benzylpiperazine, prepared as described in Example 2, 30 g. of propionyl anhydride are added dropwise under stirring. Stirring is continued for 1 hour and a half, then the mixture is added and poured into 70 ml. 10% HCl. The aqueous solution is extracted with diethyl ether, and the ether solution is dried and evaporated to give 42 g. of 1-propionyl-2,2,6-trimethyl-4-benzylpiperazine. B.P. 120–125°/0.4 mm. Hg.

*Analysis.*—Calcd. for $C_{17}H_{26}N_2O$: C, 74.40; H, 9.55; N, 10.21. Found: C, 74.33; H, 9.75; N, 10.25.

EXAMPLE 5

*1-propionyl-2,2,6-trimethyl-4-cinnamyl-piperazine*

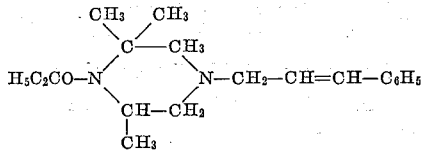

To 3 g. of 1-propionyl-2,2,6-trimethylpiperazine in 60 ml. of anhydrous acetone, 3.25 g. of cinnamyl chloride are added under stirring in the presence of 3 g. of $K_2CO_3$. The mixture is refluxed 8 hours, and then filtered. The filtrate is evaporated to dryness and the residue, taken up with water and made acidic with 10% HCl, is washed with diethyl ether. This extract which contains unreacted materials is discarded. The acidic aqueous solution is made alkaline with $Na_2CO_3$ and extracted with diethyl ether. The ether extract is dried over $Na_2SO_4$, evaporated to dryness and distilled to give 4.5 g. of 1-propionyl - 2,2,6 - trimethyl-4-cinnamyl-piperazine. B.P. 160–170°/0.5 mm. Hg.

*Analysis.*—Calcd. for $C_{19}H_{28}N_2O$: C, 75.95; H, 9.39; N, 9.32. Found: C, 76.31; H, 9.68; N, 8.95.

EXAMPLES 6-41

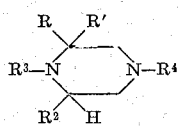

| R | R' | R² | R³ | R⁴ | Chimicophysical characteristics |
|---|---|---|---|---|---|
| $CH_3$ | H | $CH_3$ | $CH_3$ | $COC_2H_5$ | B.P., 98-100°/0.8 |
| $CH_3$ | H | $CH_3$ | $COC_2H_5$ | $CH_3$ | B.P., 73-75°/0.6 |
| $CH_3$ | H | $CH_3$ | Cinnamyl | $COC_2H_5$ | B.P., 175-180°/0.2 |
| $CH_3$ | H | $CH_3$ | $COC_2H_5$ | Cinnamyl | B.P., 182°/0.6 |
| $CH_3$ | H | $CH_3$ | $COC_2H_5$ | H | B.P., 90-93°/0.5 |
| $CH_3$ | H | $CH_3$ | H | $COC_2H_5$ | B.P., 85°/0.5 |
| $CH_3$ | H | $CH_3$ | $COC_6H_5$ | H | B.P., 128-130°/0.5 |
| $CH_3$ | H | $CH_3$ | $CH_2C_6H_5$ | H | B.P., 97-98°/0.6 |
| $CH_3$ | H | $CH_3$ | H | $CH_2C_6H_5$ | B.P., 85-86°/0.6 |
| $CH_3$ | H | $CH_3$ | $COC_2H_5$ | $CH_2C_6H_5$ | B.P., 140°/0.5 |
| $CH_3$ | H | $CH_3$ | $CH_2C_6H_5$ | $COC_2H_5$ | B.P., 140-145°/0.4 |
| $CH_3$ | H | $CH_3$ | $C_6H_5CO$ | $CH_2C_6H_5$ | B.P., 190-195°/1 |
| $CH_3$ | H | $CH_3$ | $C_6H_5CH_2$ | $COC_6H_5$ | B.P., 200°/1 |
| $CH_3$ | H | $CH_3$ | $CH_3$ | $CH_2C_6H_5$ | B.P., 95-100°/0.6 |
| $CH_3$ | H | $CH_3$ | $CH_3$ | H | B.P., 85-90°/40 |
| $CH_3$ | H | $CH_3$ | $CH_2C_6H_5$ | $CH_3$ | B.P., 100°/0.4 |
| $CH_3$ | H | $CH_3$ | H | $CH_3$ | B.P., 80°/40 |
| $CH_3$ | H | $CH(CH_3)_2$ | H | $CH_2C_6H_5$ | B.P., 100-102°/0.5 |
| $CH_3$ | $CH_3$ | $CH_3$ | $CH_3$ | H | B.P., 93-95°/40 |
| $CH_3$ | $CH_3$ | $CH_3$ | H | H | M.P., 158-62° |
| $CH_3$ | $CH_3$ | $CH_3$ | H | $CH_3$ | M.P., 180°; B.P., 69-70°/22 |
| $CH_3$ | $CH_3$ | $CH_3$ | H | $CH_2C_6H_5$ | B.P., 80-85°/0.6 |
| $CH_3$ | H | $CH_3$ | $CH_3$ | H | B.P., 85-87°/40 |
| $CH_3$ | H | $CH_3$ | $CH_3$ | $CH_2C_6H_5$ | B.P., 95-96°/0.6 |
| $CH_3$ | H | $CH_3$ | $CH_2C_6H_5$ | $CH_3$ | B.P., 100°/0.4 |
| $CH_3$ | H | $CH_3$ | H | $CH_3$ | B.P., 85°/40 |
| $CH_3$ | $CH_3$ | $CH_3$ | $CH_3$ | H | B.P., 93-95°/40 |
| $CH_3$ | $CH_3$ | $CH_3$ | $CH_3$ | $CH_2C_6H_5$ | B.P., 95-97°/0.5 |
| $CH_3$ | $CH_3$ | $CH_3$ | $CH_3$ | $COC_2H_5$ | B.P., 98-100°/0.8 |
| $CH_3$ | $CH_3$ | $CH_3$ | $COC_2H_5$ | H | B.P., 94°/0.4 |
| $CH_3$ | $CH_3$ | $CH_3$ | $COC_2H_5$ | $CH_3$ | B.P., 115-120°/5 |
| $CH_3$ | H | $CH_3$ | $COC_2H_5$ | $CH(C_6H_5)_2$ | M.P., 130-132° |
| $CH_3$ | H | $CH_3$ | H | $CH(C_6H_5)_2$ | M.P., 91-93°; M.P., 296-300° (hydrochloride); B.P., 150°/0.5 |
| $CH_3$ | H | $CH_3$ | Cinnamyl | $CH(C_6H_5)_2$ | M.P., 171-3° |
| $CH_3$ | H | $CH(CH_3)_2$ | H | $CH(C_6H_5)_2$ | M.P., 65-68° |
| $CH_3$ | $CH_3$ | $CH_3$ | H | $CH(C_6H_5)_2$ | M.P., 212-215° (hydrochloride); B.P., 145-150°/0.6; M.P., 94-96° |

We claim:
1. 2,2,6-trimethyl-4-benzylpiperazine.
2. 1-benzoyl-4-benzyl-2,6-dimethylpiperazine.
3. 1-benzyl-2,6-dimethylpiperazine.
4. 1-benzyl-4-benzoyl-2,6-dimethylpiperazine.
5. 1-propionyl-2,2,6-trimethyl-4-cinnamylpiperazine.
6. 2,6-dimethyl-1-propionyl-4-cinnamylpiperazine.
7. 2,4,6-trimethyl-1-propionylpiperazine.
8. 2,6-dimethyl-1-cinnamyl-4-propionylpiperazine.

References Cited by the Examiner

UNITED STATES PATENTS

| | | |
|---|---|---|
| 2,762,805 | 9/1956 | Safir et al. |
| 2,763,652 | 9/1956 | Safir et al. |
| 2,881,157 | 4/1959 | O'Neil. |
| 2,882,271 | 4/1959 | Janssen. |
| 2,927,114 | 3/1960 | Izzo et al. |
| 2,958,624 | 11/1960 | Bimber. |
| 3,046,277 | 7/1962 | Anslow. |
| 3,167,561 | 1/1965 | Sarett et al. |

FOREIGN PATENTS 705,979   3/1954   Great Britain.

OTHER REFERENCES

Pope et al.: Journal Chemical Society (London), vol. 105, pages 219-246 (pages 230-233, 238 and 243 relied on), 1914.

ALEX MAZEL, *Primary Examiner.*

N. S. RIZZO, HENRY R. JILES, *Examiners.*

J. W. ADAMS, *Assistant Examiner.*